(12) United States Patent
Bianchi et al.

(10) Patent No.: US 11,473,432 B2
(45) Date of Patent: Oct. 18, 2022

(54) ANTI-CMAS COATING WITH ENHANCED EFFICIENCY

(71) Applicant: SAFRAN, Paris (FR)

(72) Inventors: Luc Bianchi, Moissy-Cramayel (FR); Aurélien Joulia, Moissy-Cramayel (FR); Benjamin Dominique Roger Joseph Bernard, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 16/621,535

(22) PCT Filed: Jun. 12, 2018

(86) PCT No.: PCT/FR2018/051359
§ 371 (c)(1),
(2) Date: Dec. 11, 2019

(87) PCT Pub. No.: WO2018/229409
PCT Pub. Date: Dec. 20, 2018

(65) Prior Publication Data
US 2020/0102843 A1 Apr. 2, 2020

(30) Foreign Application Priority Data

Jun. 12, 2017 (FR) .................................... 1755210

(51) Int. Cl.
*F01D 5/28* (2006.01)
*C23C 4/04* (2006.01)
(Continued)

(52) U.S. Cl.
CPC ................ *F01D 5/284* (2013.01); *C23C 4/04* (2013.01); *C23C 4/10* (2013.01); *C23C 4/11* (2016.01);
(Continued)

(58) Field of Classification Search
CPC .... B32B 1/02; B32B 1/08; C23C 4/04; C23C 4/06; C23C 4/10; C23C 4/11; C23C 4/12;
(Continued)

(56) References Cited

U.S. PATENT DOCUMENTS 5,740,515 A 4/1998 Beele
2004/0115406 A1* 6/2004 Nagaraj .............. C23C 28/3455
428/209

(Continued)

FOREIGN PATENT DOCUMENTS

CN 101081735 A 12/2007
CN 102947485 A 2/2013
(Continued)

OTHER PUBLICATIONS

Clarke, D. R. et al., "Thermal-barrier coatings for more efficient gas-turbine engines," MRS Bulletin, vol. 37, Oct. 2012, pp. 891-898.

(Continued)

*Primary Examiner* — Walter Aughenbaugh
(74) *Attorney, Agent, or Firm* — Pillsbury Winthrop Shaw Pittman LLP (57) ABSTRACT

A coated gas turbine engine part includes a substrate and a calcium-magnesium-alumino-silicate CMAS protection layer present on the substrate. The layer includes a first phase of a calcium-magnesium-alumino-silicate CMAS protection material and a second phase including particles of an anti-wetting material dispersed in the first phase.

10 Claims, 3 Drawing Sheets (51) Int. Cl.
*C23C 4/11* (2016.01)
*C23C 4/129* (2016.01)
*C23C 4/134* (2016.01)
*C23C 4/10* (2016.01)

(52) U.S. Cl.
CPC ............. *C23C 4/129* (2016.01); *C23C 4/134* (2016.01); *F01D 5/286* (2013.01); *F01D 5/288* (2013.01); *F05D 2220/32* (2013.01); *F05D 2230/312* (2013.01); *F05D 2300/512* (2013.01); *Y02T 50/60* (2013.01)

(58) Field of Classification Search
CPC ........... C23C 4/129; C23C 4/131; C23C 4/14; C23C 4/18; F01D 5/284; F01D 5/286; F01D 5/288; F01D 5/3092
See application file for complete search history.

(56) References Cited

U.S. PATENT DOCUMENTS

| | | |
|---|---|---|
| 2014/0220378 A1 | 8/2014 | Nagaraj et al. |
| 2014/0234096 A1 | 8/2014 | Klam et al. |
| 2016/0362775 A1 | 12/2016 | Read et al. |
| 2017/0137949 A1 | 5/2017 | Bahraini Hasani et al. |
| 2018/0370862 A1 | 12/2018 | Kirby et al. |

FOREIGN PATENT DOCUMENTS

| | | | | |
|---|---|---|---|---|
| CN | 104988455 A | | 10/2015 | |
| CN | 105039894 A | * | 11/2015 | |
| CN | 105039894 A | | 11/2015 | |
| EP | 1 806 431 A2 | | 7/2007 | |
| EP | 2 202 212 A2 | | 6/2010 | |
| EP | 2 537 822 A2 | | 12/2012 | |
| EP | 2537822 A2 | * | 12/2012 | ........... C04B 41/009 |
| EP | 2 778 147 A2 | | 9/2014 | |
| EP | 3 168 323 A1 | | 5/2017 | |
| EP | 3168323 A1 | * | 5/2017 | ......... C23C 18/1633 |
| EP | 3 178 799 A1 | | 6/2017 | |
| FR | 3 053 329 A1 | | 1/2018 | |
| JP | 2013-136845 A | | 7/2013 | |
| RU | 2 167 220 C2 | | 5/2001 | |
| RU | 2 594 092 C2 | | 8/2016 | |
| WO | WO 2009/091721 A2 | | 7/2009 | |
| WO | WO 2011/110794 A1 | | 9/2011 | |
| WO | WO 2015/116300 A2 | | 8/2015 | |

OTHER PUBLICATIONS

Zhu, D., et al., "Thermal and Environmental Barrier Coatings for Advanced Propulsion Engine Systems," NASA Technical Memorandum, NASA-TM—2004—213129, (2004), 16 pages.

Levi, C. G. et al., "Enviromental degradation of thermal-barrier coatings by molten deposits," MRS Bulletin, vol. 37, Oct. 2012, pp. 932-941.

Krämer, S., "Infiltration-Inhibiting Reaction of Gadolinium Zirconate Thermal Barrier Coatings with CMAS Melts," Journal of the American Ceramic Society, 91[2], (2008), pp. 576-583.

Wang, H., "Reaction mechanism of $CaO$—$MgO$—$Al_2O_3$—$SiO_2$ (CMAS) on lanthanide zirconia thermal barrier coatings," PHD Thesis, Auburn University, USA, May 2016, 151 pages.

Harder, B. J., et al., "Chemical and Mechanical Consequences of Enviromental Barrier Coating Exposure to Calcium-Magnesium-Aluminosilicate," Journal of the American Ceramic Society, vol. 94, No. s1, Mar. 2011, XP055495764, pp. s178-s185.

International Search Report as issued in International Patent Application No. PCT/FR2018/051359, dated Aug. 16, 2018.

First Office Action as issued in Chinese Patent Application No. 201880039272.9, dated Jan. 11, 2022.

Notice of Reasons for Refusal as issued in Japanese Patent Application No. 2020-518586, dated Jul. 5, 2022.

Non-Final Office Action as issued in U.S. Appl. No. 16/621,568, dated Aug. 1, 2022.

English language translation of JP2013136845A generated on Jul. 21, 2022 with Espacenet website (https://www.epo.org/searching-for-patents/technical/espacenet.html).

* cited by examiner

ANTI-CMAS COATING WITH ENHANCED EFFICIENCY

CROSS-REFERENCE TO RELATED APPLICATIONS

This application is the U.S. National Stage of PCT/FR2018/051359, filed Jun. 12, 2018, which in turn claims priority to French patent application number 1755210 filed Jun. 12, 2017. The content of these applications are incorporated herein by reference in their entireties.

BACKGROUND OF THE INVENTION

The present invention relates to the general field of protective coatings used to thermally insulate parts in high-temperature environments such as parts used in hot parts of aeronautical or land gas turbine engines.

In order to improve the efficiency of gas turbine engines, in particular high-pressure turbines (HPT) for stationary land-based systems or for aeronautical propulsion, increasingly higher temperatures are being considered. Under these conditions, the materials used, such as metallic alloys or ceramic matrix composites (CMC), require protection, mainly to maintain a sufficiently low surface temperature to ensure their functional integrity and limit their oxidation/corrosion by the surrounding atmosphere.

"Thermal barrier" (TB) or "environmental barrier coating" (EBC) protections are complex multilayer stacks generally consisting of a bond coat allowing protection against oxidation/corrosion deposited on the surface of the base material (metal alloys or composite material) of the substrate, itself topped by a ceramic coating whose primary function is to limit the surface temperature of the coated components. In order to ensure its protection function against oxidation/corrosion and to promote the adhesion of the ceramic coating, the bond coat can be pre-oxidized to form a dense alumina layer on its surface called "thermally grown oxide" (TGO) in the case of thermal barriers. Such protection systems are described in particular in documents D. R. Clarke, M. Oechsner, N. P. Padture, "Thermal-barrier coatings for more efficient gas-turbine engines", MRS Bulletin, 37, 2012, pp 892-898 and D. Zhu, R. A. Miller, "Thermal and Environmental Barrier Coatings for Advanced Propulsion Engine Systems", NASA Technical Memorandum, 213129, 2004.

The service life of these systems (TB and EBC) depends on the resistance of the stack to thermal cycling, on the one hand, and on the resistance of the outer layer to environmental stresses (erosion by solid particles, chemical resistance, corrosion, etc.), on the other hand.

In particular, these systems degrade very quickly when exposed to a medium rich in sand or volcanic ash particles (rich in inorganic silica type compounds) commonly known by the generic name CMAS (for oxides of Calcium, Magnesium, Aluminium and Silicon). The infiltration of molten CMAS into a thermal or environmental barrier generally results in degradation by:

stiffening of the infiltrated layer leading to mechanical failure (delamination);

destabilization by chemical dissolution of the thermal barrier and formation of recrystallized products with different mechanical properties and/or volumes.

To overcome this problem, so-called "anti-CMAS" compositions have been developed, which allow the formation of a waterproof barrier layer by chemical reaction with CMAS as described in document C. G. Levi, J. W. Hutchinson, M.-H. Vidal-Sétif, C. A. Johnson, "Environmental degradation of thermal barrier coatings by molten deposits", MRS Bulletin, 37, 2012, pp 932-941.

However, these systems still have functional limitations that reduce their effectiveness, among which, particular mention may be made of:

The cracking of the TB in service by thermo-mechanical effect inducing infiltration paths favoured by molten CMAS;

The persistence of a variable infiltrated thickness due to the competition between the capillary infiltration of CMAS in the coating and the reaction kinetics of the formation of the impermeable barrier phase. The greater the infiltrated thickness, the greater the risk of mechanical weakening of the TB. Indeed, a stiffening of the system is to be feared, leading to limited service lives despite the cessation of CMAS infiltration;

The need to use an anti-CMAS coating with a dense morphology and free of vertical cracks in order to minimize this capillary infiltration of the liquid contaminant. In this case, the system becomes sensitive to the thermo-mechanical stresses induced by the differences in thermal expansion coefficient of the different system elements, and therefore results in limited service lives once again.

There is therefore a need for a gas turbine engine part with a CMAS protection layer to limit the depth of penetration of molten CMAS into the protective layer.

SUBJECT MATTER AND SUMMARY OF THE INVENTION

The principal aim of the present invention is therefore to limit the capillary penetration of molten CMAS into an anti-CMAS protection layer by promoting the formation reaction of the protective impermeable layer as close as possible to the surface of the coating by providing a coated gas turbine engine part comprising a substrate and at least one calcium-magnesium-alumino-silicate CMAS protection layer present on said layer, the layer comprising a first phase of a calcium-magnesium-alumino-silicate CMAS protection material and a second phase comprising particles of a liquid CMAS anti-wetting material dispersed in the protective layer. "CMAS anti-wetting material" means a material which gives the calcium-magnesium-alumino-silicate CMAS protection layer the property of having a contact angle between the exposed surface of said protection layer and a drop of liquid CMAS greater than or equal to 45°, preferably greater than or equal to 90°.

The addition of a non-wetting phase for CMAS in divided form in the first phase or matrix phase of the anti-CMAS protection layer will not only limit contact between molten CMAS and the CMAS protection layer on the surface of the latter, but also limit the infiltration of liquid contaminants into vertical cracks. Thus, the reactivity of the protective layer, allowing the formation by chemical reaction with CMAS of a continuous layer impervious to any other contamination (barrier layer), is favoured over capillary infiltration mechanisms.

This increases the service life of a gas turbine engine part including the CMAS protection layer in accordance with the invention by promoting the formation of the protective impermeable layer as close as possible to the surface of the protective layer. The sacrificial aspect of the protective layer is reduced, as is its stiffening. The service life of the protective layer and, consequently, of the coated gas turbine engine part is further increased by allowing vertical cracking of the CMAS protection layers with enhanced reactivity, which allows thermo-mechanical deformations to be accommodated without vertical cracking being infiltrated by CMAS.

According to a particular aspect of the invention, the anti-wetting material used for the second phase of the protective layer corresponds to a material or mixture of materials selected from the following materials: $CaF_2$, $LnPO_4$ where Ln=La (lanthanum), Gd (gadolinium), Sm (samarium), Nd (neodymium)), MAX phases ($M_{n+1}AX_n$ (n=1, 2, 3) where M=Sc (scandium), Y (yttrium), La (lanthanum), Mn (manganese), Re (rhenium), W (tungsten), Hf (hafnium), Zr (zirconium), Ti (titanium), A=groups IIIA, IVA, VA, VIA and X=C, N, AlN, BN, SiC and SiOC.

According to another particular aspect of the invention, the anti-wetting material particles dispersed in the CMAS protection layer have an average size between 10 nm and 10 µm.

According to another particular aspect of the invention, the CMAS protection layer has a volume content of anti-wetting material particles of between 1% and 80%.

According to another particular aspect of the invention, the volume percentage of anti-wetting material particles present in the CMAS protection layer varies in the direction of the thickness of the protective layer, the volume percentage of anti-wetting material particles gradually increasing between a first zone of said layer adjacent to the substrate and a second zone of said layer remote from the first zone.

According to another particular aspect of the invention, the CMAS protection layer has a thickness between 1 µm and 1000 µm.

According to another particular aspect of the invention, the calcium-magnesium-alumino-silicate CMAS protection material of the first phase corresponds to one of the following materials or to a mixture of the following materials: rare-earth zirconates $RE_2Zr_2O_7$, where RE=Y (yttrium), La (lanthanum), Ce (cerium), Pr (praseodymium), Nd (neodymium), Pm (promethium), Sm (samarium), Eu (europium), Gd (gadolinium), Tb (terbium), Dy (dysprosium), Ho (holmium), Er (erbium), Tm (thulium), Yb (ytterbium), Lu (lutecium), partially or fully stabilized zirconia, delta phases $A_4B_3O_{12}$, where A=Y→Lu and B=Zr, Hf, composites $Y_2O_3$ with $ZrO_2$, $Al_2O_3$, or $TiO_2$, hexaaluminates, spinels, rare-earth RE monosilicates and disilicates where RE=Y, La, Ce, Pr, Nd, Pm, Sm, Eu, Gd, Tb, Dy, Ho, Er, Tm, Yb, Lu).

According to another particular aspect of the invention, a thermal barrier layer is interposed between the substrate and the calcium-magnesium-alumino-silicate CMAS protection layer.

According to another particular aspect of the invention, the substrate is made of nickel or cobalt-based superalloy and has on its surface an alumino-forming bond layer or a ceramic matrix composite (CMC) layer, or a ceramic matrix composite (CMC) layer coated with an alumino-forming bond layer.

The invention also relates to a process for manufacturing a gas turbine engine part according to the invention, comprising at least one step of forming a calcium-magnesium-alumino-silicate CMAS protection layer directly on the substrate or on a thermal barrier layer present on the substrate, the forming step being performed with one of the following processes:
- suspension plasma spraying from at least one suspension containing a powder or precursor of a calcium-magnesium-alumino-silicate CMAS protection material and a powder or precursor of a non-wetting material or any combination of these elements,
- high-velocity flame spraying from at least one suspension containing a powder or precursor of a calcium-magnesium-alumino silicate CMAS protection material and a powder or precursor of a non-wetting material or any combination of these elements,
- atmospheric-pressure plasma spraying of a powder of a calcium-magnesium-alumino-silicate CMAS protection material in combination with suspension plasma spraying or high-velocity flame spraying from a solution containing a powder or precursor of non-wetting suspended material.

BRIEF DESCRIPTION OF THE DRAWINGS

Other features and advantages of the present invention will emerge from the description given below, with reference to the appended drawings which illustrate exemplary embodiments without any restrictive character. On the figures.

DETAILED DESCRIPTION OF THE INVENTION

The invention applies generally to any gas turbine engine part coated with a protective layer comprising a phase of a calcium-magnesium-alumino-silicate CMAS protection material. "CMAS protection material" means all materials which prevent or reduce the infiltration of molten CMAS into the protective layer, in particular by forming at least one impermeable barrier layer. Examples of the most frequently encountered impermeable barrier layers include the formation of apatite phases of the generic formula ($Ca_4Re_6(SiO_4)_6O$) or $Ca_2Re_d(SiO_4)_6O_2$ or anorthic phases of the generic formula $CaAl_2Si_2O_8$.

By way of nonlimiting examples, the calcium-magnesium-alumino-silicate CMAS protection material likely to form by chemical reaction with CMAS a continuous layer or phase impervious to any other contamination such that an apatite phase corresponds to one of the following materials or to a mixture of several of the following materials: rare-earth zirconates $RE_2Zr_2O_7$, where RE=Y (yttrium), La (lanthanum), Ce (cerium), Pr (praseodymium), Nd (neodymium), Pm (promethium), Sm (samarium), Eu (europium), Gd (gadolinium), Tb (terbium), Dy (dysprosium), Ho (holmium), Er (erbium), Tm (thulium), Yb (ytterbium), Lu (lutecium), partially or fully stabilized zirconia, delta phases $A'_4B_3O_{12}$, where A' denotes any element selected from: Y, La, Ce, Pr, Nd, Pm, Sm, Eu, Gd, Tb, Dy, Ho, Er, Tm, Yb and Lu and B=Zr, Hf, the composites comprising $Y_2O_3$ with $ZrO_2$, $Al_2O_3$, or $TiO_2$, hexaaluminates, spinels, monosilicates and rare-earth RE disilicates where RE=Y, La, Ce, Pr, Nd, Pm, Sm, Eu, Gd, Tb, Dy, Ho, Er, Tm, Yb, Lu. Preferably, the calcium-magnesium-alumino-silicate CMAS protection material is selected from: rare-earth zirconates, doped zirconia, rare-earth silicates and their mixture.

In accordance with the invention, to this first phase, which constitutes the matrix of the CMAS protection layer, is added a second phase in the form of particles of at least one CMAS anti-wetting material dispersed in the protective layer, the matrix of which is formed by the first phase.

Indeed, the presence of a non-wetting phase in the volume of the CMAS protection layer limits the capillary infiltration of molten CMAS into the layer and thus locates the formation reaction of the anti-CMAS barrier layer as close as possible to the surface of the protective layer. Thus, changes in thermo-mechanical properties or volumes, resulting from the formation of new phases, do not induce strong mechanical stresses at the core of the protective layer. This increases the service life of the protection and, consequently, of the coated gas turbine engine part under operating conditions. The presence of a CMAS non-wetting phase in the volume of the CMAS protection layer also makes it possible to maintain the full benefit of the vertical cracking, initial or induced by thermo-mechanical effect in use, of the protective layer, by limiting the infiltration of these cracks by the liquid contaminant. Once again, the service life of the protection and, consequently, of the gas turbine engine part under operating conditions is increased. In addition, the presence of the non-wetting phase in the volume of the CMAS protection layer in finely dispersed form increases its anti-wetting efficiency.

The particles dispersed in the matrix or first phase of the CMAS protection layer may consist in particular of a CMAS anti-wetting material corresponding to a material or mixture of materials selected from the following materials: $CaF_2$, $LnPO_4$ where Ln=La (lanthanum), Gd (gadolinium), Sm (samarium), Nd (neodymium)), MAX phases ($M_{n+1}AX_n$ (n=1, 2 or 3) where M=Sc (scandium), Y (yttrium), La (lanthanum), Mn (manganese), Re (rhenium), W (tungsten), Hf (hafnium), Zr (zirconium), Ti (titanium), A denotes any element of groups IIIA, IVA, VA or VIA and X=C, N, AlN, BN, SiC and SiOC. More preferably, the CMAS anti-wetting material is selected from the following materials: $CaF_2$, $LnPO_4$, BN and their mixtures.

The second non-wetting phase in the form of particles dispersed in the CMAS protection layer can be obtained from powders and suspensions.

The CMAS anti-wetting material particles dispersed in the first phase preferably have an average size between 10 nm and 10 µm and preferentially between 10 nm and 1 µm. In the present disclosure, the terms "between . . . and . . . " are to be understood as including the boundaries.

The protective layer has a volume content of CMAS anti-wetting material particles that can be between 1% and 80%, preferentially between 1% and 30%.

The protective layer may have a composition gradient wherein the volume percentage of the first phase of the anti-CMAS material and the second phase of CMAS anti-wetting material particles changes with the thickness of the protective layer. More precisely, the volume percentage of anti-wetting material particles present in the anti-wetting layer can vary with the thickness of the protective layer, the volume percentage of anti-wetting material particles gradually increasing between a first zone of said layer adjacent to the substrate and a second zone of said layer remote from the first zone in order to concentrate the content of the anti-wetting agent protection layer near its surface.

The protective layer preferably has a porous structure, which allows it to have good thermal insulation properties. The protective layer may also have vertical cracks, initially present in the layer or formed during use, which give the layer a higher deformation capacity and therefore a longer service life. The porous and cracked microstructure (initially or in use) of the protective layer is mainly obtained by controlling the forming (deposition) process of the layer as well known per se.

Thanks to the presence of a second CMAS anti-wetting phase in the protective layer to retain liquid CMAS in the vicinity of the layer surface, these porosities and cracks no longer constitute favoured paths for the infiltration of molten CMAS as in the prior art. The effectiveness of the CMAS protection material used in the first phase is thus preserved.

Figure 1:
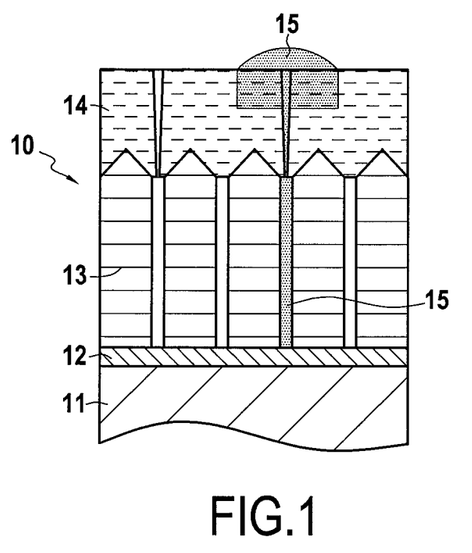
FIG. 1 shows the infiltration of liquid contaminants into a gas turbine engine part with a calcium-magnesium-alumino-silicate CMAS protection layer according to the prior art.
Figure 2:
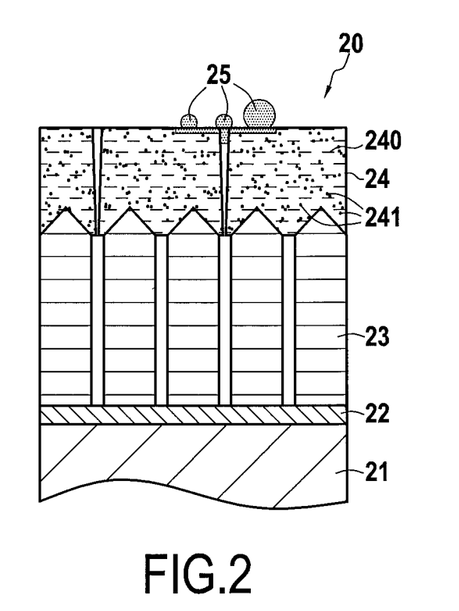
FIGS. 2 and 3 show the infiltration of liquid contaminants into a gas turbine engine part with a calcium-magnesium-alumino-silicate CMAS protection layer according to the invention.
Figure 3:
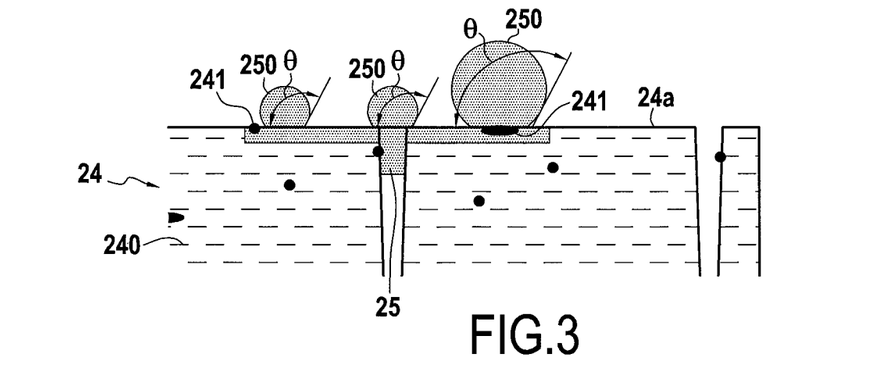

FIGS. 1, 2 and 3 illustrate the effects produced by a calcium-magnesium-alumino-silicate CMAS protection layer according to the invention, namely a composite protective layer comprising the first and second phases described above, and a calcium-magnesium-alumino silicate CMAS protection layer according to the prior art. More precisely, FIG. 1 shows a part 10 consisting of a nickel-based superalloy substrate 11 coated in the order of an alumino-forming bond coat 12, a thermal barrier layer 13 made of $ZrO_2$—$Y_2O_3$ (8% by mass) commonly noted YSZ and a CMAS protection layer 14 according to the prior art made of $Gd_2Zr_2O_7$, the part being in the presence of liquid CMAS 15 (molten).

FIG. 2 shows a part 20 consisting of a nickel-based superalloy substrate 21 coated, in order, with an alumino-forming bond coat 22, a thermal barrier layer 23 made of YSZ and a CMAS protection layer 24, the layer 24 comprising here a first phase 240 consisting of $Gd_2Zr_2O_7$ as a CMAS protection material and a second phase 241 dispersed in the layer 24 and consisting of calcium fluoride $CaF_2$ as CMAS anti-wetting material, the part being in the presence of liquid CMAS 25 (molten).

In the case of a protection layer according to the prior art as shown in FIG. 1, the liquid CMAS contaminants 15 penetrate deeply into the cracks of the protective layer 14 as well as into the thermal barrier layer 13.

In a different way, in the case of a protection layer according to the invention as shown in FIG. 2, the infiltration depth of the liquid CMAS contaminants 25 into the protective layer 24 is limited by the presence of the second phase 241 consisting of CMAS anti-wetting material particles dispersed in the protective layer 24. More precisely, as illustrated in FIG. 3, the liquid CMAS contaminants 25 are retained on the surface of the protective layer 24 upon contact with the second phase 241, which considerably limits the penetration depth of liquid CMAS 25 into the porosity and cracks of the protective layer 24 and forms by chemical reaction with the first phase continuous and contaminant-proof layers or phases as close as possible to the surface of the protective layer.

"CMAS anti-wetting material" means a material which gives the layer protection against calcium-magnesium-alumino-silicates CMAS 24 the property of having a contact angle θ between the exposed surface 24a of the protective layer 24 and drops 250 of liquid CMAS 24 greater than or equal to 45°, preferably greater than or equal to 90°.

The addition of a CMAS non-wetting phase to the CMAS protection layer not only limits contact between molten CMAS and the CMAS protection layer on the surface of the latter, but also limits the infiltration of liquid contaminants into vertical cracks. Thus, the reactivity of the barrier layer, allowing the formation by chemical reaction with CMAS of a continuous layer impervious to any other contamination, is favoured over capillary infiltration mechanisms.

The calcium-magnesium-alumino-silicates CMAS protection layer according to the invention has a thickness between 1 μm and 1000 μm and preferentially between 5 μm and 200 μm.

The substrate of the gas turbine engine part that is the subject matter of the invention can be made of a nickel or cobalt-based superalloy. In this case, the substrate may also have an alumino-forming bond coat on its surface. For example, the alumino-forming bond coat may include MCrAlY alloys (where M=Ni, Co, Ni and Co), nickel aluminides type β-NiAl (optionally modified by Pt, Hf, Zr, Y, Si or combinations of these elements), aluminides of alloys γ-Ni-γ'-Ni$_3$Al (optionally modified by Pt, Cr, Hf, Zr, Y, Si or combinations of these elements), MAX phases ($M_{n+1}AX_n$ (n=1, 2, 3) where M=Sc, Y, La, Mn, Re, W, Hf, Zr, Ti; A=groups IIIA, IVA, VA, VIA; X=C, N), or any other suitable bond coat, as well as mixtures thereof. The substrate can also consist of superalloys AM1, MC-NG, CMSX4 and derivatives, or Rene and derivatives.

The bond coat protects the substrate from corrosion and oxidation while ensuring a good mechanical and/or chemical bond between the substrate and the overlying layer corresponding in particular to the CMAS protection layer of the invention or to a thermal barrier layer.

Bond layers can be formed and deposited by physical vapour deposition (PVD), APS, HVOF, low-pressure plasma spraying (LPPS) or derivatives, inert plasma spraying (IPS), chemical vapour deposition (CVD), Snecma vapour-phase aluminizing (SVPA), spark plasma sintering, electrolytic deposition, as well as any other suitable deposition and forming process.

The substrate used in the invention has a shape corresponding to that of the gas turbine engine part to be made. Turbomachine parts including the protective layer according to the invention may be, but not exclusively, blades, nozzle vanes, high-pressure turbine rings and combustion chamber walls.

The composite calcium-magnesium-alumino-silicate protection layer, i.e. comprising the first and second phases as defined above, can be applied directly to the substrate of the gas turbine engine part. The protective layer of the invention constitutes in this case a thermal barrier for the substrate.

According to a variant embodiment, a thermal barrier layer may be interposed between the substrate and the composite protection layer of the invention, or between an alumino-forming bond coat and the composite protection layer of the invention, the latter being used in this case as a functionalization layer on the surface of the thermal barrier layer which may or may not provide protection against high-temperature liquid calcium-magnesium-alumino-silicate CMAS contaminants. By way of non-limiting example, the thermal barrier layer can be made of yttriated zirconia with a $Y_2O_3$ mass content of between 7% and 8%. The thermal barrier layer, on which the composite protection layer of the invention is made, may have a microstructure, homogeneous, homogeneous and porous, vertically microcracked, vertically microcracked and porous, columnar, columnar and porous, as well as architectures including these different microstructures.

The thermal barrier layer can be formed and deposited by electron beam-physical vapour deposition (EB-PVD), APS, HVOF, sol-gel, SPS, solution precursor plasma spraying (SPPS), HVSFS or any other suitable process.

The composite protection layer of the invention can be implemented as a functionalization layer on the surface of a complex stack describing an environmental barrier coating (EBC), or on a thermal/environmental barrier coating (TEBC), protecting ceramic matrix composite (CMC) parts. The thermal/environmental barrier system, which protects CMC materials among others, may include, but is not limited to, the materials: $MoSi_2$, BSAS ($BaO_{1-x}$—$SrO_x$—$Al_2O_3$-$2SiO_2$), mullite (3 $Al_2O_3$-2 $SiO_2$), rare-earth RE monosilicates and disilicates where RE=Y, La, Ce, Pr, Nd, Pm, Sm, Eu, Gd, Tb, Dy, Ho, Er, Tm, Yb, Lu), totally or partially stabilized or doped zirconia, and any other suitable composition and mixtures thereof.

The composite protection layer of the invention may be formed and deposited by one of the following processes:
- atmospheric plasma spraying (APS),
- high-velocity oxygen fuel (HVOF),
- suspension plasma spraying (SPS),
- solution precursor plasma spraying (SPPS),
- high-velocity suspension flame spraying (HVSFS), also known as suspension-HVOF (S-HVOF).

Example 1

Figure 4:
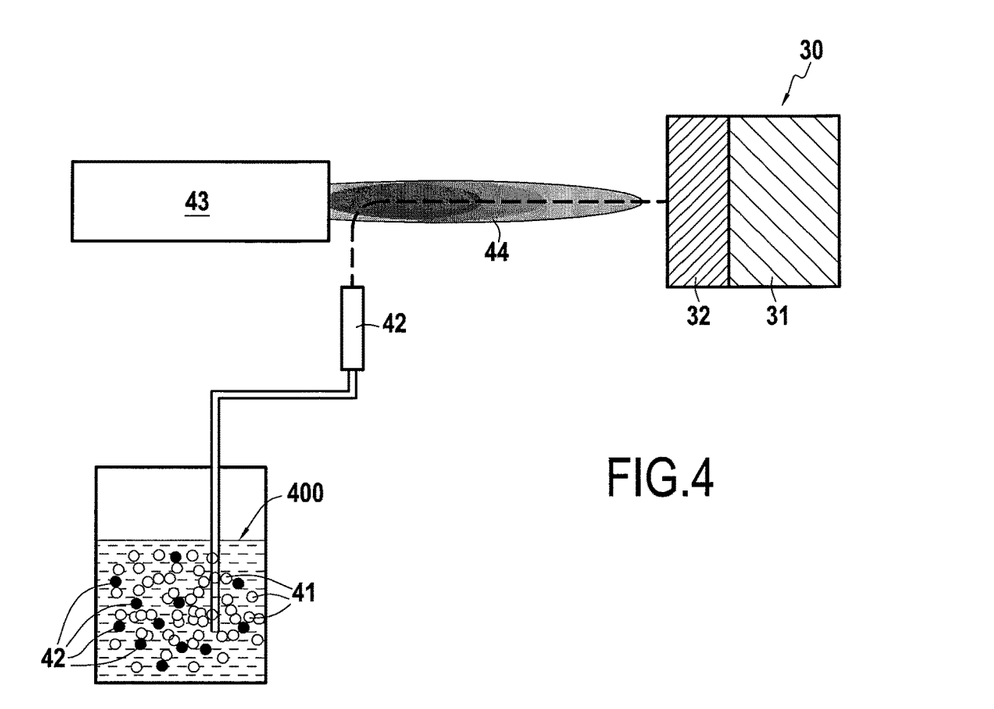
FIG. 4 is a first exemplary embodiment of a process for producing a gas turbine engine part according to the invention.

As shown in FIG. 4, a process for manufacturing a gas turbine engine part 30 in conformity with the invention was carried out on a substrate 31 made of AM1 nickel base superalloy on which a composite calcium-magnesium-alumino-silicate CMAS protection layer 32 was applied by SPS, the protective layer 32 comprising, in accordance with the invention, a first phase of $Gd_2Zr_2O_7$ as calcium-magnesium-alumino-silicate CMAS protection material and a second phase of $CaF_2$ in the form of particles dispersed in the protective layer 32 as CMAS anti-wetting material.

In this example, a solution 40 containing a powder of the anti CMAS material in suspension 41, here $Gd_2Zr_2O_7$, and a powder of the CMAS anti-wetting material 42, here $CaF_2$, in volume proportions adapted for the realization of the protective layer 32, is used. The solution 40 is injected through the same suspension injector 42 into a plasma jet 44 generated by a plasma torch 43, allowing the thermokinetic treatment of the solution 40, namely the melting and acceleration of powders.

The example does not exclude the possibility of using other anti-CMAS materials or other CMAS non-wetting materials. In addition, it is also possible that the liquid phase of the solution may no longer contain powders but precursors of one or both of the two phases that are to be formed within the composite protection layer. In this particular case, the thermokinetic treatment will form the in-situ phase in flight, melt it and accelerate it to generate the coating. It is also possible to produce the composite coating by using not a plasma but a high-velocity flame resulting from this case in an HVSFS mode of production.

Example 2

Figure 5:
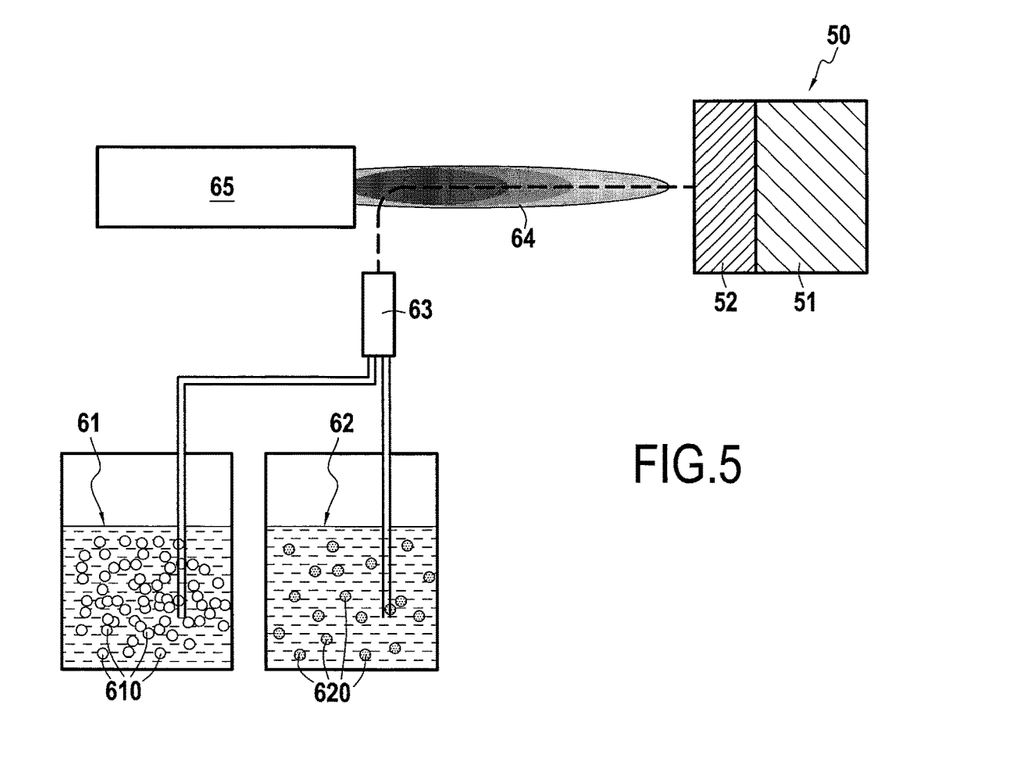
FIG. 5 is a second exemplary embodiment of a process for producing a gas turbine engine part according to the invention.

As shown in FIG. 5, a process for manufacturing a gas turbine engine part 50 in conformity with the invention was carried out on a substrate 51 made of AM1 nickel base superalloy on which a composite calcium-magnesium-alumino-silicate CMAS protection layer 52 was applied by SPS, the protective layer 52 comprising, in accordance with the invention, a first phase of $Gd_2Zr_2O_7$ as calcium-magnesium-alumino silicate CMAS protection material and a second phase of $CaF_2$ in the form of particles dispersed in the protective layer 52 as CMAS anti-wetting material.

In this example, a first solution 61 containing a powder of the anti-CMAS material in suspension 610, here $Gd_2Zr_2O_7$, and a second solution 62 containing a powder of a CMAS anti-wetting material in suspension 620, here $CaF_2$, in volume proportions adapted for the realization of the protective layer 62, are used. The two solutions 61 and 62 are injected through the same suspension injector 63 into the core of a plasma jet 64 generated by a plasma torch 65, allowing the thermokinetic treatment of the solutions 61 and 62, namely the melting and acceleration of powders.

The example does not exclude the possibility of using other anti-CMAS materials or other CMAS non-wetting materials. In addition, it is also possible that the liquid phase of the solution may no longer contain powders but precursors of one or both of the two phases that are to be formed within the composite protection layer. In this particular case, the thermokinetic treatment will form the in-situ phase in flight, melt it and accelerate it to generate the coating. It is also possible to produce the composite coating by using not a plasma but a high-velocity flame resulting from this case in an HVSFS mode of production.

Example 3

Figure 6:
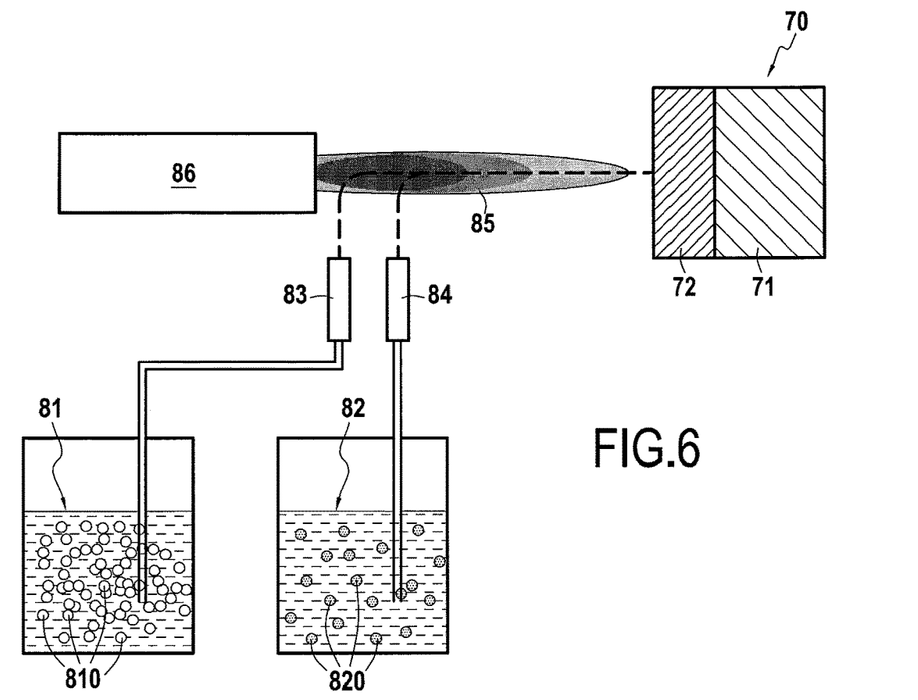
FIG. 6 is a third exemplary embodiment of a process for producing a gas turbine engine part according to the invention.

As shown in FIG. 6, a process for manufacturing a gas turbine engine part 70 in conformity with the invention was carried out on a substrate 71 made of AM1 nickel base superalloy on which a composite calcium-magnesium-alumino-silicate CMAS protection layer 72 was applied by SPS, the protective layer 72 comprising, in accordance with the invention, a first phase of $Gd_2Zr_2O_7$ as calcium-magnesium-alumino silicate CMAS protection material and a second phase of $CaF_2$ in the form of particles dispersed in the protective layer 72 as CMAS anti-wetting material.

In this example, a first solution 81 containing a powder of the anti-CMAS material in suspension 810, here $Gd_2Zr_2O_7$, and a second solution 82 containing a powder of a CMAS anti-wetting material in suspension 820, here $CaF_2$, in volume proportions adapted for the realization of the protective layer 72, are used. The solutions 81 and 82 are injected respectively through a first and a second specific suspension injectors 83 and 84 into the core of a plasma jet 85 generated by a plasma torch 86, allowing the thermokinetic treatment of the solutions 81 and 82, namely the fusion and acceleration of powders.

The example does not exclude the possibility of using other anti-CMAS materials or other CMAS non-wetting materials. In addition, it is also possible that the liquid phase of the solution may no longer contain powders but precursors of one or both of the two phases that are to be formed within the composite protection layer. In this particular case, the thermokinetic treatment will form the in-situ phase in flight, melt it and accelerate it to generate the coating. It is also possible to produce the composite coating by using not a plasma but a high-velocity flame resulting from this case in an HVSFS mode of production.

Example 4

Figure 7:
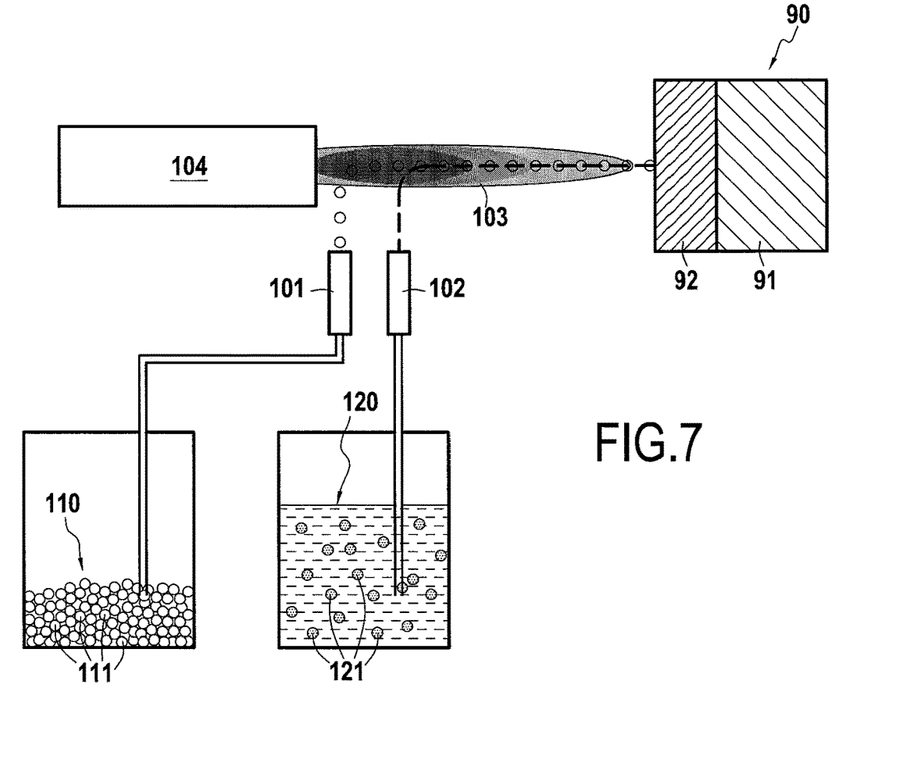
FIG. 7 is a fourth exemplary embodiment of a process for producing a gas turbine engine part according to the invention.

As shown in FIG. 7, a process for manufacturing a gas turbine engine part 90 in conformity with the invention was carried out on a substrate 91 made of AM1 nickel base superalloy on which a composite calcium-magnesium-alumino-silicate CMAS protection layer 92 was applied by hybrid SPS and APS, the protective layer 92 comprising, according to the invention, a first phase of $Gd_2Zr_2O_7$ as calcium-magnesium-alumino-silicate CMAS protection material and a second phase of $CaF_2$ in the form of particles dispersed in the protective layer 92 as CMAS anti-wetting material.

In this example, a powder 110 composed of particles 111 of the anti-CMAS material, here $Gd_2Zr_2O_7$, and a solution 120 containing a powder of a CMAS anti-wetting material in suspension 121, here $CaF_2$, in volume proportions adapted for the realization of the protective layer 92, are used. For the powder 110, the APS process is used, whereby the powder 110 is injected through a first specific injector 101 into the core of a plasma jet 103 generated by a plasma torch 104, allowing the thermokinetic treatment of the powder 110. For the solution 120, the SPS process is used wherein the solution 120 is injected through a second specific suspension injector 102 into the core of the plasma jet 103 generated by a plasma torch 104, allowing the thermokinetic treatment of the powder 120.

The example does not exclude the possibility of using other anti-CMAS materials or other non-wetting materials. In addition, it is also possible that the liquid phase may no longer contain powders but precursors of one or both of the two phases that are to be formed within the composite layer. In this particular case, the thermokinetic treatment will form the in-situ phase in flight, melt it and accelerate it to generate the coating. It is also possible to produce the composite coating by using not only a plasma mixture but also a high-velocity flame resulting from this case in a hybrid HVOF and HVSFS production mode.

The invention claimed is:

1. Coated gas turbine engine part comprising a substrate and at least one calcium-magnesium-alumino-silicate (CMAS) protection layer present on said substrate, the layer comprising a first phase of a calcium-magnesium-alumino-silicate (CMAS) protection material and a second phase comprising particles of an anti-wetting material dispersed in the first phase, wherein the first phase is a matris phase, the CMAS protection material being capable of forming apatite or anorthic type phases when in contact with molten CMAS, the anti-wetting material corresponding to a material or mixture of materials selected from the following materials:

$CaF_2$, $LnPO_4$ where Ln=La (lanthanum), Gd (gadolinium), Sm (samarium), Nd (neodymium), MAX phases $M_{n+1}AX_n$ with n=1, 2, 3 where M=Sc (scandium), Y (yttrium), La (lanthanum), Mn (manganese), Re (rhenium), W (tungsten), Hf (hafnium), Zr (zirconium), Ti (titanium), where A=groups IIIA, IVA, VA, VIA and where X=C,N, AlN, and

BN.

2. The part according to claim 1, wherein the particles of the anti-wetting material dispersed in the first phase have an average size between 10 nm and 10 μm.

3. The part according to claim 1, wherein the volume percentage of particles of the anti-wetting material dispersed in the first phase is between 1% and 80%.

4. The part according to claim 3, wherein the volume percentage of particles of the anti-wetting material dispersed within the first phase material varies in the direction of the thickness of the protective layer, the volume percentage of said particles gradually increasing between a first zone of said layer adjacent to the substrate and a second zone of said layer remote from the first zone.

5. The part according to any claim 1, wherein the calcium-magnesium-alumino-silicate (CMAS) protection layer has a thickness between 1 μm and 1000 μm.

6. The part according to any claim 1, wherein the calcium-magnesium-alumino-silicate (CMAS) protection material of the first phase is capable of forming apatite type phases and is one of the following materials or a mixture of the following materials:
- rare-earth zirconates $RE_2Zr_2O_7$, where RE=Y (yttrium), La (lanthanum), Ce (cerium), Pr (praseodymium), Nd (neodymium), Pm (promethium), Sm (samarium), Eu (europium), Gd (gadolinium), Tb (terbium), Dy (dysprosium), Ho (holmium), Er (erbium), Tm (thulium), Yb (ytterbium), or Lu (lutecium),
- partially or totally stabilized zirconia,
- delta phases $A'_4B_3O_{12}$, where A'=Y, La, Ce, Pr, Nd, Pm, Sm, Eu, Gd, Tb, Dy, Ho, Er, Tm, Yb or Lu and B=Zr, Hf,
- composites comprising $Y_2O_3$ with $ZrO_2$, $Al_2O_3$, or $TiO_2$,
- hexaaluminates,
- spinels,
- rare-earth RE monosilicates and disilicates where RE=Y, La, Ce, Pr, Nd, Pm, Sm, Eu, Gd, Tb, Dy, Ho, Er, Tm, Yb, or Lu.

7. The part according to any claim 1, further comprising a thermal barrier coating interposed between the substrate and the calcium-magnesium-alumino-silicate (CMAS) protection layer.

8. The part according to any claim 1, wherein the substrate is a nickel or cobalt-based superalloy and has on its surface an bond coat containing aluminum or a ceramic matrix composite (CMC) layer, or a ceramic matrix composite (CMC) layer coated with an alumino-forming bond coat.

9. Process for manufacturing a part according to any claim 1, comprising at least one step of forming the calcium-magnesium-alumino-silicate (CMAS) protection layer directly on the substrate or on a thermal barrier layer present on the substrate, the forming step being performed with one of the following methods:
- suspension plasma spraying from at least one suspension containing a powder or precursor of a calcium-magnesium-alumino-silicate (CMAS) protection material and a powder or precursor of an anti-wetting material,
- high-velocity flame spray suspension from at least one suspension containing a powder or precursor of a calcium-magnesium-alumino-silicate (CMAS) protection material and a powder or precursor of an anti-wetting material,
- atmospheric-pressure plasma spraying of a powder of a calcium-magnesium-alumino-silicate (CMAS) protection material in combination with suspension plasma spraying or high-velocity flame spraying from a solution containing a precursor of an anti-wetting ceramic material or a powder of the suspended anti-wetting ceramic material.

10. The part according to claim 2, wherein the volume percentage of particles of the anti-wetting material dispersed in the first phase is between 1% and 80%.

* * * * *

UNITED STATES PATENT AND TRADEMARK OFFICE
CERTIFICATE OF CORRECTION

PATENT NO. : 11,473,432 B2
APPLICATION NO. : 16/621535
DATED : October 18, 2022
INVENTOR(S) : Luc Bianchi et al.

It is certified that error appears in the above-identified patent and that said Letters Patent is hereby corrected as shown below:

In the Claims

Claim 1 should read:
1. Coated gas turbine engine part comprising a substrate and at least one calcium–magnesium–alumino–silicate (CMAS) protection layer present on said substrate, the layer comprising a first phase of a calcium–magnesium–alumino–silicate (CMAS) protection material and a second phase comprising particles of an anti–wetting material dispersed in the first phase, wherein the first phase is a matrix phase, the CMAS protection material being capable of forming apatite or anorthic type phases when in contact with molten CMAS,
    the anti–wetting material corresponding to a material or mixture of materials selected from the following materials:
    $CaF_2$,
    $LnPO_4$ where Ln = La (lanthanum), Gd (gadolinium), Sm (samarium), Nd (neodymium),
    MAX phases $M_{n+1}AX_n$ with n=1,2,3 where M = Sc (scandium), Y (yttrium), La (lanthanum), Mn (manganese), Re (rhenium), W (tungsten), Hf (hafnium), Zr (zirconium), Ti (titanium), where A = groups IIIA, IVA, VA, VIA and where X = C,N,
    AlN, and
    BN.

Signed and Sealed this
Fifteenth Day of November, 2022

Katherine Kelly Vidal
*Director of the United States Patent and Trademark Office*